United States Patent

[11] 3,540,371

[72] Inventors Rome, R. Rudolph,
 Gibsonia;
 Carl Strutz, Jr.,
 Mars; Frank C. Strutz, Mars, Pa.
[21] Appl. No. 846,629
[22] Filed July 14, 1969
[45] Patented Nov. 17, 1970
[73] Assignees Carl Strutz & Co., Inc.,
 Valencia, Pennsylvania, a corporation of
 Pennsylvania
 Continuation of Ser. No.
 647,802, June 21, 1967, abandoned

[54] APPARATUS FOR TRIMMING AND DECORATING PLASTIC WORKPIECES
 2 Claims, 14 Drawing Figs.
[52] U.S. Cl................................................... 101/38,
 101/124, 101/126, 118/35, 198/19, 83/914
[51] Int. Cl................................................. B41f 17/18
[50] Field of Search.......................................... 101/35,
 38—40, 227, 124, 126; 118/35; 83/914; 198/19

[56] References Cited
UNITED STATES PATENTS
| | | | |
|---|---|---|---|
| 2,316,972 | 4/1943 | Pond | 118/35X |
| 2,876,815 | 3/1959 | Rogers | 101/35X |
| 3,138,098 | 6/1964 | Worth | 101/227 |
| 3,251,298 | 5/1966 | Rudolph et al. | 101/40 |

Primary Examiner—Robert E. Pulfrey
Assistant Examiner—Clifford D. Crowder
Attorney—Murray & Linkhauer ABSTRACT: Unitary apparatus for trimming excess material from blow molded plastic workpieces and for applying decorative imprints to a selected area of said workpieces. The apparatus includes a base supporting endless conveyor means, trimming means and decorator means. The plastic workpieces are loaded onto one end of the conveyor means, are conveyed thereby sequentially past the trimming means and the decorator means, and are unloaded from the opposite end of the conveyor means. Surface treatment and imprint drying operations heretofore required are not required in the present unitary apparatus.

Patented Nov. 17, 1970

INVENTORS.
ROME R. RUDOLPH
CARL STRUTZ, JR.
FRANK C. STRUTZ
BY
Murray & Linkhauer

ATTORNEYS

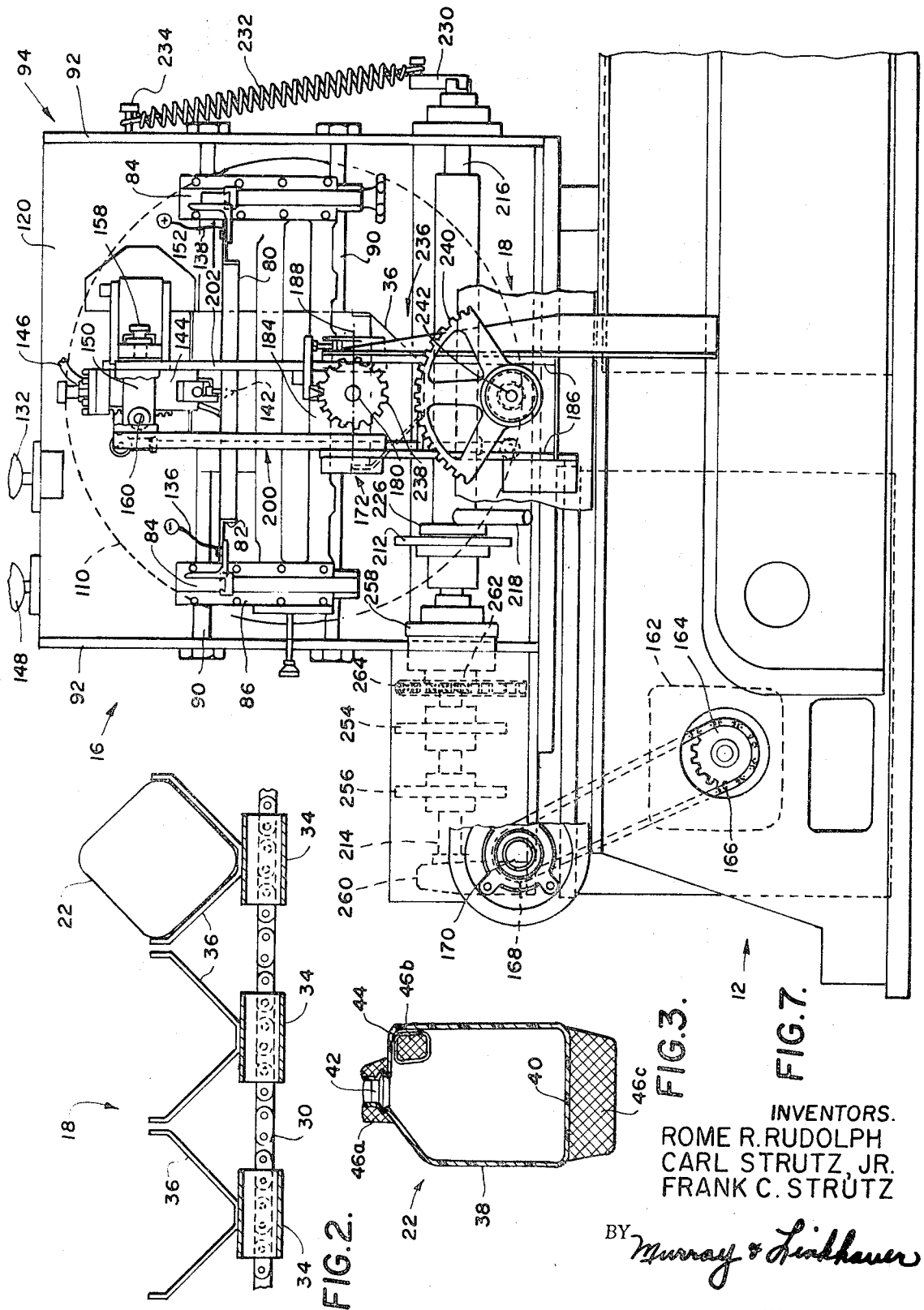

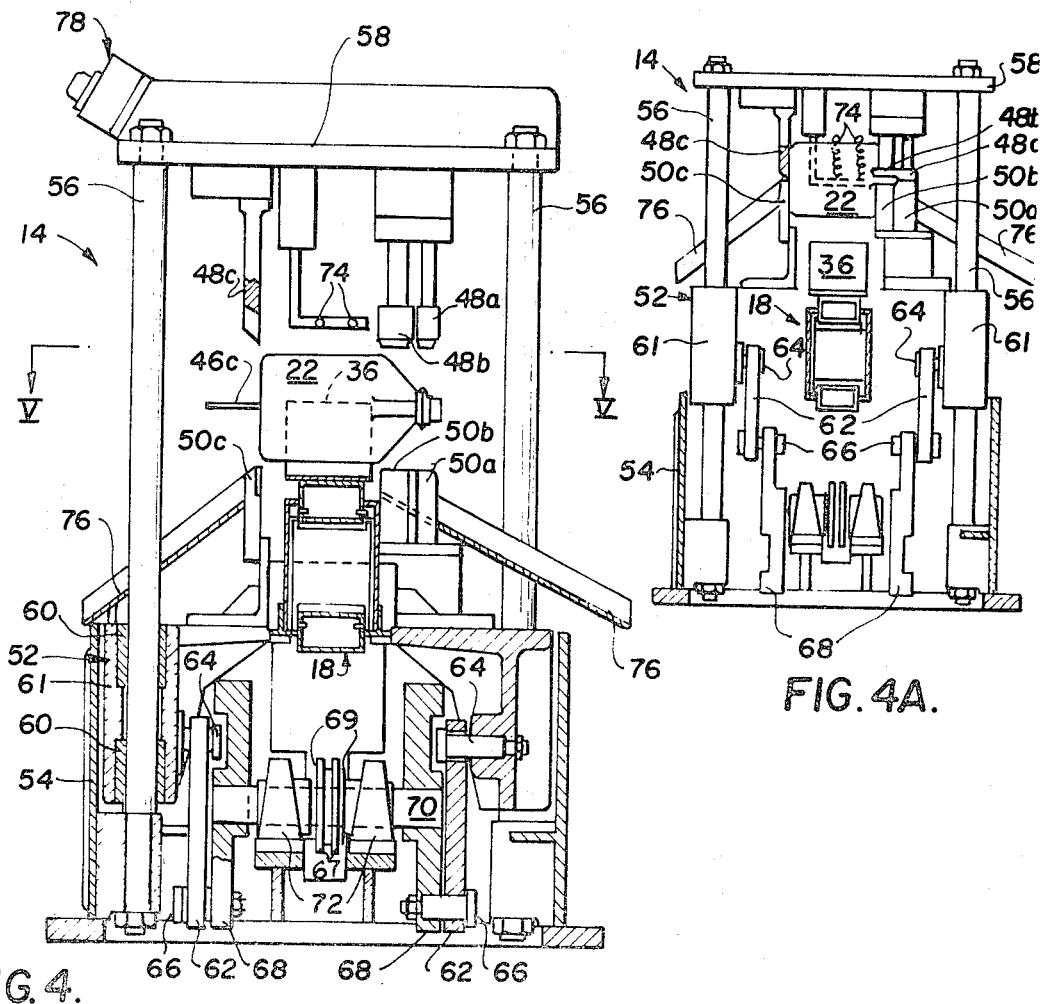
FIG. 4.
FIG. 4A.
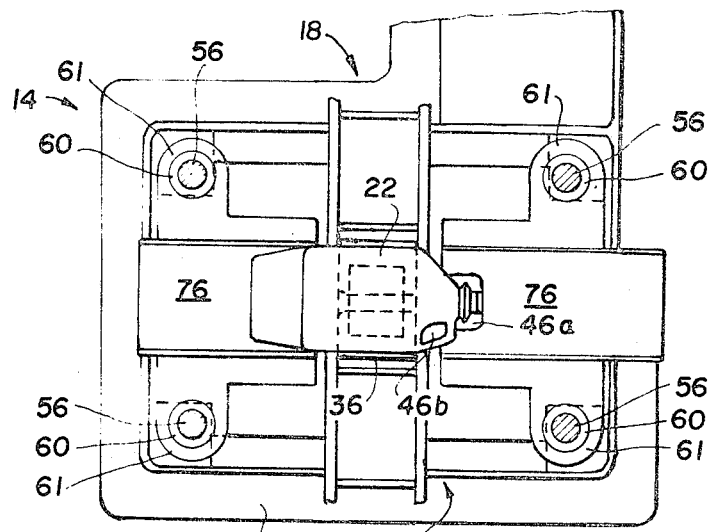
FIG. 5.
INVENTORS.
ROME R. RUDOLPH
CARL STRUTZ, JR.
FRANK C. STRUTZ
BY
*Murray & Linkhauer*
ATTORNEYS INVENTORS.
ROME R. RUDOLPH
CARL STRUTZ, JR.
FRANK C. STRUTZ
BY
*Murray & Linkhauer*
ATTORNEYS INVENTORS.
ROME R. RUDOLPH
CARL STRUTZ, JR.
FRANK C. STRUTZ
BY Murray & Linkhauer
ATTORNEYS

APPARATUS FOR TRIMMING AND DECORATING PLASTIC WORKPIECES

CROSS-REFERENCES TO RELATED APPLICATIONS

This application is a continuation of application Ser. No. 647,802 filed June 21, 1967, now abandoned.

BACKGROUND OF THE INVENTION

1. Field of the Invention

This invention relates to apparatus for trimming and decorating plastic workpieces, and more particularly to apparatus of the type described incorporating a single endless conveyor, trimming means and decorator means supported by a common base.

2. Description of the Prior Art

In the past, blow molded plastic articles, such as plastic containers, were forced to travel a sinuous and long path during which numerous operations were performed on the articles. Basically, each article is trimmed to remove excess plastic material from its periphery, which material is formed during blow molding. Thereafter, an imprint is applied to a selected surface area. The imprint is decorative and advertises the contents of the container and the manufacturer.

Although these two basic operations are relatively simple, numerous other operations or acts also had to be performed. For example, after leaving the blow molding apparatus, each article is cooled and then deposited on a horizontal conveyor which is part of the trimming machine. The article is conveyed to the trimming dies, trimmed of excess material and conveyed therebeyond. The trimmed article is removed from the conveyor and deposited in a chute which carries the article through a ring of fire during which a surface of the plastic article is flame treated and rendered susceptible to decoration. After surface treatment, the article is deposited on another conveyor which is part of a decorating machine having a decorating station. The trimmed and treated article is conveyed to the decorating station where an imprint is applied. Thereafter, the decorated article is conveyed through a drying station where the printing medium of the imprint is dried. The decorated article is then removed from the decorating apparatus and conveyed to the packaging area.

As will be appreciated, the above described apparatus occupies a considerable amount of floor space, requires the close attention of numerous operators, and involves a large capital investment. It will also be appreciated that the surface treating operation and the drying operation heretofore required have made it impossible to attain a relatively high production rate of finished articles.

SUMMARY OF THE INVENTION

The principal object of the present invention is to provide unitary apparatus for trimming and decorating plastic articles.

Another object of the present invention is to provide a single endless conveyor for conveying plastic articles sequentially past trimming means and decorating means.

A further object of the present invention is to provide apparatus wherein blow molded plastic articles are trimmed of excess material at a trimming station, conveyed therefrom directly to a decorating station whereat they are decorated, and then conveyed directly to discharge —the operation of surface treatment and imprint drying being eliminated.

Still another object of the present invention is to provide unitary apparatus for trimming and decorating plastic articles, said apparatus being compact and having an overall length which is considerably less than the overall length of prior art apparatus performing these functions.

In accordance with the present invention, a unitary compact apparatus is provided for trimming and decorating plastic articles such as those plastic articles which have been produced by blow molding operations. The present apparatus comprises a base supporting trimming means and decorating means at spaced locations along its length. Endless conveyor means is also supported on the base and extends between and beyond both the trimming means and the decorating means. Drive means is provided for moving the endless conveyor whereby each workpiece is moved in succession and sequentially to the trimming means for trimming and to the decorator means for decorator. The drive means of the present apparatus imparts intermittent traveling motion to the conveyor means whereby each workpiece is brought to complete rest at the trimming means and at the decorating means.

The decorating means of the present apparatus employs a metal stencil screen supported above the endless conveyor and the workpiece residing therebelow. The metal stencil screen is heated and maintained at a selected temperature whereby on contacting the selected surface of a workpiece, the surface is pretreated to render it susceptible to decoration while simultaneously being decorated. The printing medium forced through the screen onto the pretreated surface of the workpiece, is of the type which is liquid during passage through the stencil screen and which solidifies and dries on contacting the selected surface substantially immediately after the heated stencil screen is disengaged from the selected surface. The preferred printing medium comprises a thermoresponsive coating composition of 100 percent solids material which must be liquefied by heating and which sets or dries substantially immediately on being applied to the cooler surface of the article being decorated.

The preferred printing medium consists of an admixture of an ethylene-vinyl acetate copolymer and polystyrene as the thermoresponsive vehicle, with additions of a coloring pigment; and an extender pigment. The overall range and the preferred range of concentrations of the thermoresponsive vehicle comprising the copolymer and the polystyrene, are given below in Table A and are expressed in percent by weight.

TABLE A

| Component | Overall range | Preferred range |
| --- | --- | --- |
| Ethylene-vinyl acetate copolymer | 21.7–45.8 | 25.8–38.1 |
| Polystyrene, M.W. 350 | 54.2–78.3 | 63.1–70.2 |

In the copolymer, the vinyl acetate may be present in the range of from about 17—39 percent by weight of the total copolymer composition and preferably present in the range of from about 27—37 percent.

Although polystyrene having a molecular weight of 350 is preferred, it has been found that polystyrenes with molecular weights ranging from about 300 to about 3,000 are suitable for use in the coating composition.

Examples of pigments suitable for coloring the coating composition include a yellow pigment commonly known as benzidene yellow; a red pigment sold by Dupont under the trademark Wachtung Red B; and a blue pigment commonly known as phthalocyanine blue. Mixtures of the above-named pigments will result in virtually any color shade.

The extender pigment determines the finish of the decorative imprint formed with the preferred coating compositions. Varying the concentration of the extender pigment from a low value to a higher value will change the finish of the film from a high gloss to dead flat. Extender pigments suitable for use in the preferred coating compositions include calcium carbonate, barytes, clay, talc and silicas. These pigments are employed in finely divided form with an average particle size of two microns for example.

Further in accordance with the present invention, the stencil screen is spaced above the plastic workpiece and means is provided for elevating the workpiece to position the selected surface thereof adjacent to the screen for decoration. While in this elevated position, the workpiece is rotated about its longitudinal axis while simultaneously therewith, the stencil screen is moved horizontally across the selected surface.

BRIEF DESCRIPTION OF THE DRAWINGS

The above and other objects and advantages of the present invention will become apparent from the following detailed description by reference to the accompanying drawings, in which:

FIG. 2 is a fragmentary side view, in cross section, of an endless conveyor means;

FIG. 3 is a cross-sectional view of a plastic workpiece illustrating the excess material to be trimmed therefrom;

FIGS. 4 and 4A are cross-sectional views taken along the line IV–IV of FIG. 1;

FIG. 5 is a cross-sectional view taken along the line V–V of FIG. 4;

FIG. 7 is a fragmentary front view of the decorating means of the present apparatus;

DESCRIPTION OF THE PREFERRED EMBODIMENT(S)

Figure 1:
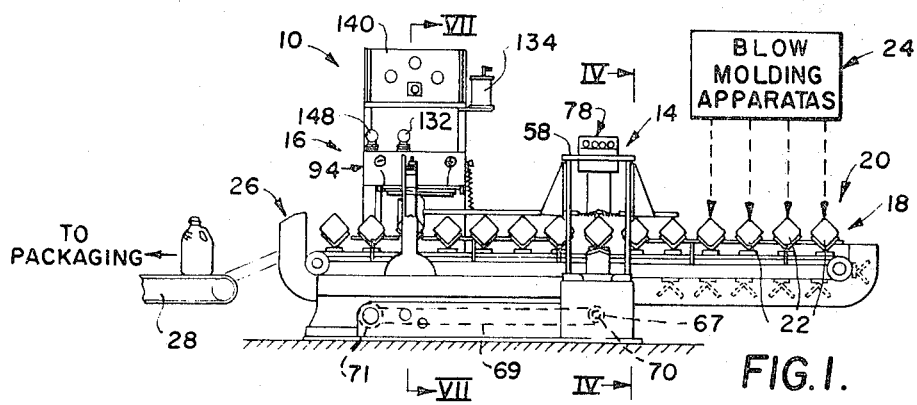
FIG. 1 is a front view illustrating the apparatus of the present invention.

Referring to FIG. 1, there is illustrated trimming and decorating apparatus 10 of the present invention. The apparatus 10 comprises a base 12 supporting trimming means 14 and decorating means 16. Endless conveyor means 18 is supported on the base 12 and extends between and beyond the trimming means 14 and the decorating means 16. The conveyor means 18 includes a loading end 20 on which plastic workpieces 22 are deposited. A plurality of the workpieces 22 are formed simultaneously in blow molding apparatus schematically illustrated at 24, from which they are deposited onto the loading end 20 of the conveyor 18. The workpieces 22 are conveyed through the apparatus 10 sequentially past the trimming means 14 and the decorating means 16 to the discharge end 26 of the apparatus 10. At the discharge end 26, the decorated workpieces are transferred to a discharge conveyor 28 for conveyance to a packaging area.

Figures 6, 8:
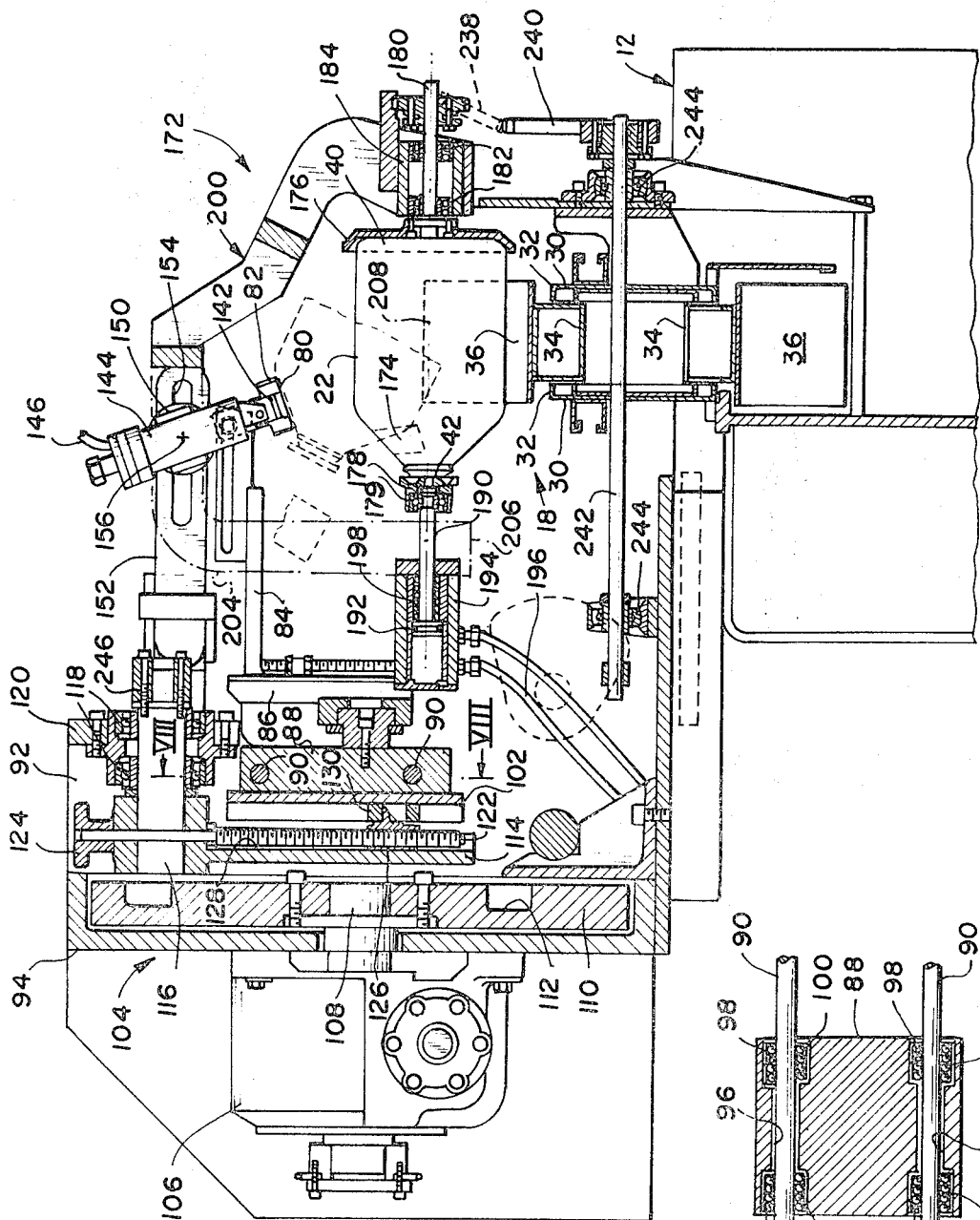
FIG. 6 is a cross-sectional view taken along the line VI–VI of FIG. 1.
FIG. 8 is a cross-sectional view taken along the line VIII–VIII of FIG. 6.

Referring now to FIGS. 2 and 6, as will be seen the endless conveyor means 18 comprises a pair of roller chains 30 supportingly engaged in guide channels 32 supported on the base 12. Connected at uniformly spaced positions along the length of the roller chains 30 are base members 34 having trough elements 36 secured thereto and adapted to carry a workpiece 22.

Referring now to FIG. 3, a workpiece 22 is illustrated in cross section. The workpiece 22 comprises a body 38 having a bottom 40, a neck 42 and a handle 44. During blow molding, flashings 46a, 46b and 46c are formed and must be trimmed from the workpiece 22.

The apparatus for trimming the flashings 46a, 46b and 46c will now be described with reference to FIGS. 4, 4A and 5. The trimming means 14 consists of stationary dies 48a, 48b and 48c which cooperate with movable dies 50a, 50b and 50c carried on a vertically reciprocating table 52. The table 52 resides within a base frame 54 which is part of the base 12. Vertically extending posts 56 are secured at their lower ends to the base frame 54 and support a plate 58 at their upper ends. The stationary dies 48a, 48b and 48c are carried on the upper plate 58. The vertically reciprocating table 52 is slideable upwardly along the posts 56 (as shown in FIG. 4A), on bushings 60 carried in housings 61. The drive for vertically reciprocating the table 52 includes link arms 62 each having one end pivotally connected to the table 52 by pins 64 and having their opposite ends pivotally connected by pins 66 to crank arms 68. The crank arms 68 are rigidly connected to a central shaft 70 which is rotatably supported in bearing elements 72. Referring to FIGS. 1 and 4, the central shaft 70 has drive sprockets 67 meshing with drive chains 69 which, as can be seen in FIG. 1, extend to and are driven by motor means 71.

In operation, as the crank arms 68 rotate, the link arms 62 cause vertical reciprocation of the table 52. The movable dies 50a, 50b and 50c are elevated into engagement with the flashings 46a, 46b and 46c, thereby elevating a workpiece 22 into engagement with the stationary dies 48a, 48b and 48c. Midway through its upward travel, the workpiece 22 engages spring elements 74 and extends the same. At the peak of its upward stroke, the flashings 46a, 46b and 46c are severed and fall into chutes 76 for discharge from the trimming means 14. When the table 52 commences its downward travel, the extended spring elements 74 urge the workpiece 22 in a downward direction, thereby disengaging the same from the stationary dies 48a, 48b and 48c. During the downward travel of the table 52, the workpiece 22 is brought to rest on the trough element 36 of the conveyor 18. The conveyor 18 is then activated to move the trimmed workpiece from the trimming station toward the decorating station and to introduce a fresh workpiece into the trimming means 14.

As can be seen in FIGS. 1 and 4, the trimming means 14 includes a control panel 78 carried on the upper plate 58. The control panel 78 displays several switches for operating the trimming means 14 and a warning light which indicates that power is on.

The construction and operation of the decorating means 16 will now be described with reference to FIGS. 6—10, inclusive. Referring in particular to FIGS. 6 and 7, the decorator means 16 includes a stencil screen 80 secured to a frame 82 whose ends are secured to outwardly projecting support arms 84. In turn, the support arms 84 are connected to a crossframe 86 and are vertically adjustable thereon to position the stencil screen 80 in relation to the selected surface of the workpiece which is to be decorated, as will be described hereinafter. The crossframe 86 is rigidly connected to a slide block 88 which is slidable along a pair of horizontal support shafts 90 having ends rigidly secured to side plates 92 of a housing 94 which is supported on the base 12. As shown in FIG. 8, the slide block 88 is provided with a pair of clearance bores 96 through which the support shafts 90 extend. The clearance bores 96 terminate in enlarged recesses 98 housing ball bushings 100 which support the slide block 88 on the shaft 90 for free sliding movement therealong.

Referring now, in particular to FIG. 6, the slide block 88 has a vertically extending channellike member 102 rigidly secured thereto. The housing 94 supports drive means 104 for reciprocating the slide block 88 and the stencil screen 80 in a horizontal direction parallel to the endless conveyor means 18. The drive means 104 is a conventional screen reciprocating drive including drive motor 106 having a drive shaft 108 secured to and rotating a circular disc 110. The circular disc 110 is provided with a cam track 112 having a noncircular configuration. A cam follower or roller (not visible) is engaged in the cam track and is connected to a reciprocating arm 114 having a shaft 116 secured thereto and rotatable in bearings 118 carried on a front plate 120 of the housing 94. The reciprocating arm 114 includes a threaded rod 122 which is rotatable by means of a knob 124. A slide member 126 is threadedly engaged with the threaded rod 122 and is guided in a groove 128 provided in the reciprocating arm 114. The slide member 126 pivotally supports a block 130 which is slideable in the channellike member 102 carried by the slide block 88.

As stated above, the drive means 104 is a conventional mechanism for reciprocating a stencil screen in timed relation with the remainder of a decorating apparatus. Hence, it will be sufficient to state that in operation, rotation of the circular disc 110 will cause the reciprocating arm 114 to undergo angular reciprocation about the shaft 116. During this angular reciprocation, the block 130 will slide vertically in the channellike member 102 while causing the slide block 88 and the stencil screen 80 to undergo horizontal reciprocating motion in a direction parallel to the endless conveyor means 18. The noncircular cam track 112, as is conventional, has a segment thereof corresponding to a dwell period in the reciprocation of the stencil screen 80 during which the stencil screen 80 is stationary.

As can be seen in FIGS. 1 and 7, conductors 136, 138 are attached to the opposite ends of the stencil screen frame 82 for passing an electric current through the stencil screen 80, thereby heating the same and maintaining it at a selected temperature. The temperature at which the stencil screen 80 is maintained is controlled by suitable controls mounted in a control box 140 (FIG. 1) supported above the housing 94. Adjacent to the control box 140 is a heating pot 134 which receives a quantity of printing medium for liquefication and comprises a source of printing medium for the stencil screen 80.

Heating of the stencil screen serves two main purposes. Firstly, the viscosity of the printing medium is maintained at a value which permits the printing medium to be forced through the screen onto a selected surface of a plastic workpiece; and, secondly, the heated screen on contacting the selected surface of the plastic workpiece pretreats the surface to render it susceptible to decoration. That is to say, pretreatment of the selected surface of the plastic workpieces promotes a firm bond between the film of printing medium comprising the decorative imprint and the surface of the plastic workpiece. As should be apparent, pretreatment of the selected surface of the workpiece and simultaneous decoration thereof considerably increases the rate at which workpieces can be decorated.

Referring again to FIGS. 6 and 7, the decorator means 16 additionally includes a squeegee 142 carried by a squeegee motor 144 of the pneumatic type and having a conduit 146 for introducing and withdrawing fluids into the squeegee motor 144. The conduit 146 is connected to a pressure control valve 132 which controls the pressure of the air in conduit 146. When pressurized air is introduced into the squeegee motor 144, the squeegee 142 is displaced toward the screen and, in turn, displaces the screen into line contact with the selected surface of a workpiece 22. On withdrawal of fluids, the squeegee 142 is disengaged from the stencil screen 80.

The squeegee motor 144 is adjustably supported in a clamping member 150 secured to an arm 152 projecting from and rigidly secured to the front plate 120 of the housing 94. The arm 152 has a longitudinal slot 154 (FIG. 6) in which the clamping member is slideable. In addition, the clamping member 150 is rotatable about an axis indicated at 156 to place the squeegee 142 in parallel relation with the stencil screen 80. As illustrated in FIG. 7, the clamping member 150 is secured to the arm 152 in an adjusted position by means of clamping knobs 158 (only one visible). In addition, the squeegee motor 144 is clamped in the clamping member 150 in an adjusted position relative to the screen 80 by means of a clamping knob 160.

Referring now to FIG. 7, the base 12 supports a conventional drive means 162 having a drive sprocket 164 meshing with a drive chain 166 which extends to a driven sprocket 168 secured to a conveyor shaft 170. The drive means 162 is a conventional intermittent drive mechanism which imparts intermittent traveling motion to the conveyor means 18. The overall arrangement is such that the endless conveyor means is moved in a stop—start fashion whereby each workpiece 22 is brought to complete rest at a plurality of locations in addition to a position corresponding with the trimming means 14 and a position corresponding with the decorator means 16. During pauses in the intermittent motion of the endless conveyor means 18, one workpiece is being trimmed of excess material while, simultaneously therewith, a previously trimmed workpiece is being decorated at the decorator station 16.

Figure 9:
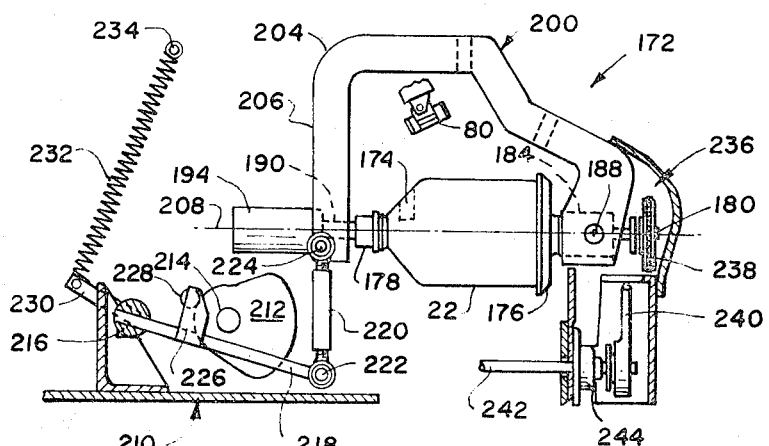
FIGS. 9 and 10 are fragmentary side views of workpiece elevating means illustrating lowered and raised positions thereof.
Figure 10:
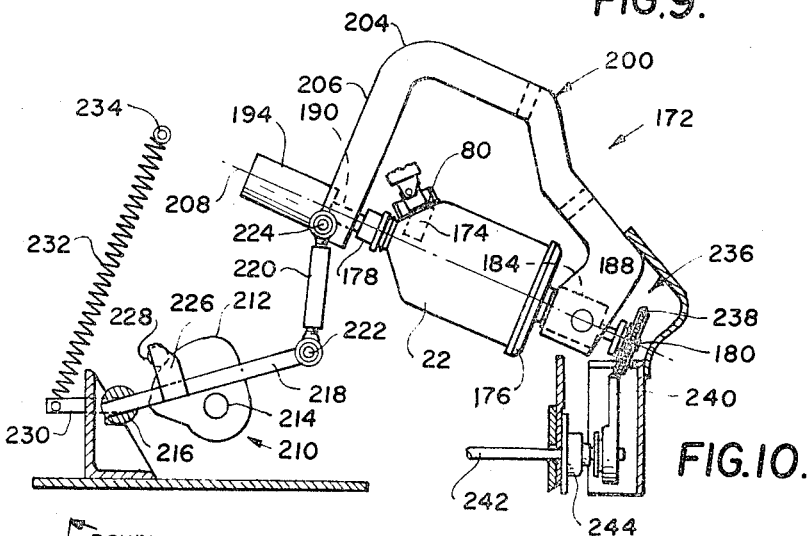

Referring now to FIGS. 6, 7, 9 and 10, the decorator means 16 additionally includes elevating means 172 for elevating a workpiece from a horizontal position as shown in FIG. 9 to an inclined position as shown in FIG. 10, wherein a selected area 174 of the workpiece 22 is in opposition with the stencil screen 80 for decoration and for returning the workpiece from the inclined to the horizontal position of FIG. 9 for deposition onto the endless conveyor means. The elevating means comprises opposed chuck members, such as a base chuck 176 and a neck chuck 178 which are positioned to engage the bottom 40 and neck 42, respectively, of the workpiece 22 as shown in FIG. 6.

The base chuck 176 includes a shaft 180 rotatably supported in journals 182 carried within a housing 184. A pair of support blocks 186 (FIG. 7) is secured to the base 12 and extends thereabove on either side of the housing 184. The housing 184 is pivotally connected to the pair of support plates 186 for pivotal motion in a vertical direction about an axis indicated in FIG. 7 by the dash-dot line 188, the pivotal axis 188 is parallel to the endless conveyor means 18.

The neck chuck 178 is supported on a rod 190 connected to a piston 192 which is slideable longitudinally of a piston motor 194. An air line 196 supplies compressed air to the interior of the piston motor 194 for displacing the neck chuck 178 into engagement with the neck 42 of the workpiece 22. The air line 196 is connected to a control valve 148 controlling the pressure level of the air. When the piston 192 is displaced toward the neck 42, a spring element 198 is compressed whereby when the compressed air is exhausted from the piston motor 194, the spring element 198 disengages the neck chuck 178 from the neck 42.

The elevating means 172 further includes common frame means 200 which unites the base chuck 176 and the neck chuck 178 for pivotal movement as a unit about the pivotal axis 188. The common frame means 200 comprises frame plate 202, 204 having corresponding ends connected to the housing 184 for pivotal movement about the pivotal axis 188. The frame plate 204 extends from the housing 184 upwardly over the stencil screen 80 and terminates in a vertical segment 206 having the piston motor 194 rigidly secured to the end thereof.

The overall arrangement of the elevating means is such that the base chuck 176 and the neck chuck 178 are aligned and support the workpiece 22 for rotation about its longitudinal axis indicated by the dash-dot line 208.

Referring now to FIGS. 7, 9 and 10, in particular, the elevating means 172 includes pivoting means 210 for pivoting the common frame means 200 about the pivotal axis 188 during pauses in the intermittent traveling motion of the endless conveyor means 18. The pivoting means 210 includes a cam 212 supported for rotation on a shaft 214. A second shaft 216 is pivotally supported at its ends to the side plates 92 of the housing 94. A lever arm 218 is rigidly connected at one end to the second shaft 216 and is pivotally connected to a link arm 220 by a pivot connection 222. The link arm 220 is, in turn, pivotally connected at its opposite end by pivot connection 224 to the vertical segment 206 of the frame plate 204.

A support plate 226 is rigidly connected to the lever arm 218 and rotatably supports a roller or cam follower 228 in a position where it engages the periphery of the cam 212.

The second shaft 216 has a second lever arm rigidly secured to one of its ends. A return spring 232 having one of its ends connected to the free end of the second lever arm 230 and the opposite end connected to a pin 234 secured to the housing 94. The return spring 232 biases the link arm 218 in the downwardly inclined position shown in FIGS. 7 and 9. In this position, the base chuck 176 and the neck chuck 178 are horizontal and are positioned to clamp a workpiece 22 therebetween.

Figure 10A:
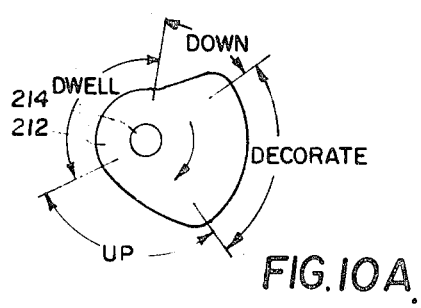
FIG. 10A is a side view of a cam.

Referring now to FIG. 10A, the cam 212 is shown with an arrow indicating that the cam 212 rotates in a clockwise direction. The configuration of the cam 212 is such that it has peripheral portions corresponding to a "dwell" period wherein the elevating means 172 is in the lowered position of FIG. 9 during which a new workpiece 22 is brought to the decorating means 16; an "up" period wherein the common frame means 200 is elevated from the position shown in FIG. 9 to the inclined position shown in FIG. 10; a "decorate" period during which the workpiece 22 is decorated; and a "down" period during which the common frame means 200 is lowered from the inclined position in FIG. 10 to the horizontal position shown in FIG. 9. Rotation of the cam 212 at a constant angular velocity results in vertical reciprocation of the common frame means 200. During the "dwell" period, the endless conveyor means is activated to introduce a new plastic workpiece 22 to the decorator means 16 and when the plastic workpiece is stationary, the piston motor 194 is activated to clamp the plastic workpiece between the base chuck 176 and the neck chuck 178. During the "up" period, the frame means 200 is elevated from the lowered position of FIG. 9 to the inclined position of FIG. 10. During the "decorate" period, which corresponds to a second dwell period, the common frame means 200 remains in the inclined position of FIG. 10 during which the workpiece is rotated, in a manner to be described, the drive motor 106 is activated to reciprocate the stencil screen 80, and the squeegee motor 144 is activated to displace the squeegee 142 into engagement with the screen 80 to displace the screen 80 into line contact with the selected surface 174 of the workpiece for decorating the same. After decoration, and during the "down" period, the common frame means 200 is lowered from the inclined position of FIG. 10 to the lowered position of FIG. 9.

The decorator means 16 is provided with a workpiece drive means 236 comprising a pinion gear 238 secured to the shaft 180 connected to the base chuck 176 and a gear segment 240 secured to a drive shaft 242 rotatably supported in journal blocks 244 carried by the base 12.

Figure 12:
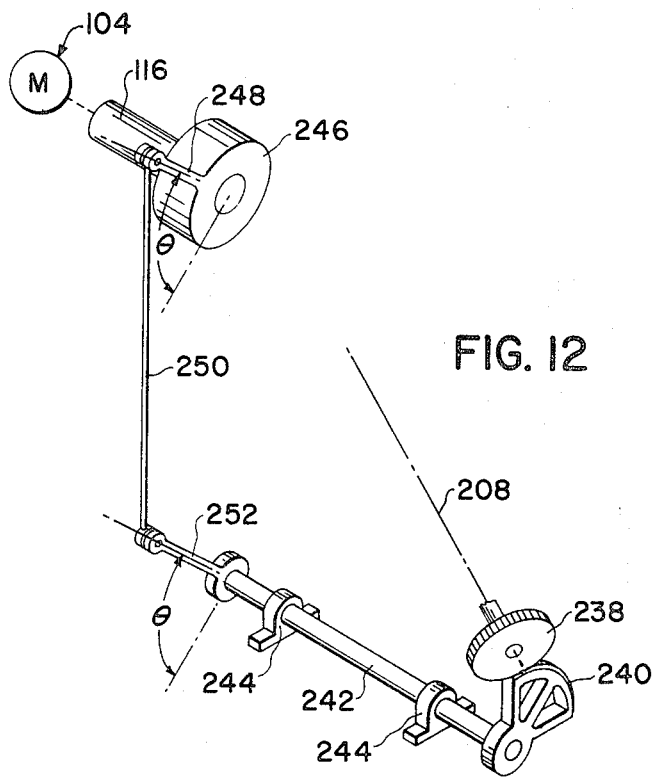
FIG. 12 is a fragmentary isometric view schematically illustrating timing cams.

The drive shaft 242 is driven by the screen drive means 104. As shown in FIG. 12, the shaft 116 connected to the reciprocating arm 114 (FIG. 6), has a hub 246 secured thereto and having an arm 248 pivotally connected to one end of a link arm 250. An arm 252 is secured to the drive shaft 242 and pivotally connected to the opposite end of the link arm 250.

In operation, the shaft 116 is rotated through an angle $\theta$. The arms 248, 250 and 252 cause the gear segment 240 to rotate through the same angle, thereby rotating the pinion gear 238 and the workpiece connected thereto.

Returning again to FIGS. 9 and 10, it will be seen that the pinion gear 238 is disengaged from the gear segment 240 when the common frame means is in the horizontal position of FIG. 9; and that the pinion gear 238 is pivoted into meshing engagement with the gear segment 240 when the common frame means 200 is elevated into the inclined position shown in FIG. 10. Thereafter, rotation of the gear segment 240 will cause rotation of the plastic workpiece 22 during which the selected area 174 is decorated. At the completion of decoration, the return spring 232 urges the common frame means 200 back to the lowered position of FIG. 9.

Figure 11:
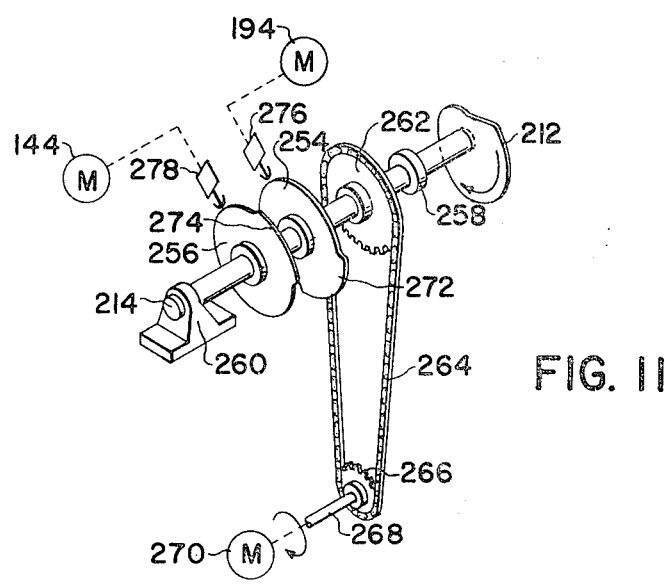
FIG. 11 is a fragmentary isometric view schematically illustrating a workpiece rotating mechanism.

Referring now to FIG. 11 there is schematically illustrated a pair of timing cams 254, 256 secured to the shaft 214 rotatably supported in journals 258, 260 (see also FIG. 7). A driven sprocket 262 is also secured to the shaft 214 and meshes with a drive chain 264 which extends therefrom to a drive sprocket 266. A drive shaft 268 supports the drive sprocket 266 which is driven by motor means schematically illustrated at 270. The motor means 270 is supported on the base 12.

The timing cams 254, 256 have lobes 272, 274, respectively, which are angularly displaced from one another so as to sequentially close switch means 276, 278 for activating, in sequence, the piston motor 194 to displace the neck chuck 178 (FIG. 6) toward a workpiece for clamping the same and the squeegee motor 144 (FIG. 6) to displace the squeegee 142 toward the screen 80.

The cam 212 and the timing cams 254, 256 are rotated at a constant angular velocity in timed relation with the conveyor drive means 162 and the trimmer drive means 71.

It should be readily apparent from the foregoing description that the present invention provides a unitary apparatus for trimming and decorating plastic articles having a single endless conveyor for conveying plastic articles sequentially past trimming means for trimming excess plastics therefrom and decorating means for decoration. Furthermore, the present invention provides unitary apparatus having an overall length which is considerably less than the overall length of prior art apparatus performing the functions of trimming and decorating.

Although the invention has been shown in connection with certain specific embodiments, it will be readily apparent to those skilled in the art that various changes in form and arrangement of parts may be made to suit requirements without departing from the spirit and scope of the invention.

We claim:

1. In apparatus for trimming and decorating plastic workpieces, the combination comprising:
   a base;
   trimmer means adjacent said base and including cooperating trimming dies for trimming excess plastic material from said plastic workpieces;
   decorator means adjacent said base and spaced from said trimming means for applying decorative imprints to selected surface areas on said plastic workpieces;
   unitary endless conveyor means supported by said base and extending between and beyond said trimmer means and said decorator means along a straight line path of travel for conveying plastic workpieces in succession along said straight line path of travel to said trimmer means for trimming and said decorator means for decoration;
   drive means for moving said endless conveyor means;
   said decorator means including a stencil screen supported above said endless conveyor means;
   said stencil screen being spaced above one of said plastic workpieces;
   a source of printing medium for said screen;
   means for elevating said workpiece to position said selected surface areas adjacent to said stencil screen; said means for elevating said workpiece comprising:
      a U-shaped member above said workpiece and having downwardly depending legs at opposite ends of the workpiece;
      opposed chuck members carried on said downwardly depending legs and positioned to engage the opposite ends of said workpiece;
      motor means for displacing one of said chuck members toward the other of said chuck members to clamp said workpiece therebetween;
      means including rotary cam means operable after actuation of said motor means for pivoting said U-shaped member and a workpiece carried thereby between a first position adjacent said endless conveyor means and a second position wherein said selected surface is in opposition with said stencil screen;
      means for displacing said stencil screen into line contact with said selected surface of said workpiece and for forcing said printing medium through said stencil screen during decoration; and
      means for heating said stencil screen and maintaining the same at a selected temperature whereby on contact with said selected surface, said selected surface is pretreated to render it susceptible to decoration while being simultaneously decorated.

2. The apparatus defined in claim 1 wherein said axis resides outboard of said endless conveyor and is spaced from both of said opposed chuck members.